United States Patent [19]

Freeman

[11] 4,320,256
[45] Mar. 16, 1982

[54] VERBALLY INTERACTIVE TELEPHONE INTERROGATION SYSTEM WITH SELECTIBLE VARIABLE DECISION TREE

[76] Inventor: Michael J. Freeman, 12 Maplewood Rd., Hartsdale, N.Y. 10530

[21] Appl. No.: 97,687

[22] Filed: Nov. 27, 1979

[51] Int. Cl.[3] .................. H04M 1/64; H04Q 3/00; G09B 7/04

[52] U.S. Cl. .................. 179/6.04; 340/825.26; 434/321; 434/335; 179/6.06; 179/2 AS

[58] Field of Search .................. 179/2 AS, 6 E, 6.04, 179/6.06; 455/2; 358/84; 340/148, 153; 434/307–310, 314–316, 319, 321–325, 335

[56] References Cited

U.S. PATENT DOCUMENTS

| | | | |
|---|---|---|---|
| 2,674,512 | 4/1954 | Bogert et al. | 346/37 |
| 2,777,901 | 1/1957 | Dostert | 179/100.2 |
| 3,194,895 | 7/1965 | Treadwell | 35/8 A X |
| 3,245,157 | 4/1966 | Laviana | 35/9 |
| 3,255,536 | 6/1966 | Linvingston | 35/9 |
| 3,273,260 | 9/1966 | Walker | 35/9 |
| 3,284,923 | 11/1966 | Leslie | 35/8 |
| 3,477,144 | 11/1969 | Stillit | 35/9 |
| 3,484,950 | 12/1969 | Serrell et al. | 35/9 |
| 3,538,621 | 11/1970 | Mayeda | 35/9 |
| 3,546,791 | 12/1970 | Koos et al. | 35/9 |
| 3,584,142 | 6/1971 | Schroeder | 178/6.8 |
| 3,623,238 | 11/1971 | Laplume et al. | 35/9 A |
| 3,651,471 | 3/1972 | Haselwood et al. | 455/2 X |
| 3,654,708 | 4/1972 | Bruder | 35/9 A |
| 3,665,615 | 5/1972 | Laplume | 35/9 A |
| 3,668,312 | 6/1972 | Yamamoto et al. | 178/6.8 |
| 3,708,891 | 1/1973 | Rosov | 35/9 A |
| 3,729,581 | 4/1973 | Anderson | 178/6.8 |
| 3,744,712 | 7/1973 | Papadopoulos et al. | 235/52 |
| 3,763,577 | 10/1973 | Goodson | 434/352 |
| 3,774,316 | 11/1973 | Meier | 35/9 B |
| 3,776,453 | 12/1973 | Friedman | 346/33 X |
| 3,906,450 | 9/1975 | Prado, Jr. | 179/2 AS X |
| 3,947,972 | 4/1976 | Freeman | 35/8 A |
| 3,950,618 | 4/1976 | Bloise | 179/2 AS |
| 3,974,335 | 8/1976 | Blackledge | 179/1 N |
| 4,008,369 | 2/1977 | Theurer et al. | 358/84 |
| 4,023,729 | 5/1977 | Eaton | 235/52 |
| 4,078,316 | 3/1978 | Freeman | 35/8 A |
| 4,107,735 | 8/1978 | Frohbach | 179/2 AS |
| 4,153,370 | 4/1979 | Root | 179/2 AS |
| 4,194,089 | 3/1980 | Hashimoto | 179/6 E |
| 4,216,497 | 8/1980 | Ishman et al. | 358/84 |

*Primary Examiner*—Aristotelis M. Psitos
*Attorney, Agent, or Firm*—Hubbell, Cohen, Stiefel & Gross

[57] ABSTRACT

An improved verbally interactive telephone interrogation system is provided in which a two-way telephone subscriber network, such as a Touch-Tone type two-way telephone subscriber network, is utilized to enable both telephone call placement and individualized remote variable audio message selection and interrogation of prerecorded audio messages as well as remote response accumulation. The Touch-Tone type telephone, which is employed to maintain normal telephone contact with other subscribers, is also utilized to call-up a multitrack magnetic storage device which provides selectible reproducible conversational responsive audio messages to particular primary reproducible interrogatory message from a plurality of different selectible audio messages stored thereon. A frequency decoder and track selection means is associated with the multitrack magnetic storage device for decoding tone signal outputs from the Touch-Tone type telephone to accomplish track selection subsequent to the connection of the subscriber to the multitrack magnetic storage device. Response recording, such as in conjunction with a pulse counter, may be operatively connected to the frequency decoder so as to accumulate responses to particular interrogatory messages based on reception of unique tone signal outputs from the Touch-Tone type telephones in the system. If desired, a rotary dial-type telephone can be employed with pulse counting and signal discrimination to distinguish between the various dial positions. In this manner, telephone subscribers may verbally interact with the prerecorded messages as well as have their responses recorded, such as for an automatic telephone survey, by use of the conventional telephone key pad on their Touch-Tone type telephone or the conventional rotary dial on their dial-type telephone.

13 Claims, 6 Drawing Figures

FIG. 1.

FIG. 2.
CONVENTIONAL TOUCH-TONE PUSH BUTTON ARRAY

FIG. 3.
CONVENTIONAL TOUCH-TONE DIAL CIRCUIT FOR TWO FREQUENCY OPERATIONS

VERBALLY INTERACTIVE TELEPHONE INTERROGATION SYSTEM WITH SELECTIBLE VARIABLE DECISION TREE

CROSS-REFERENCE TO RELATED APPLICATIONS

This application is related to my U.S. Pat. Nos. 3,947,972 and 4,078,316 as well as to my copending U.S. patent application Ser. No. 66,161, entitled "Dedicated Channel Interactive Cable Television System", filed Aug. 13, 1979, and the commonly owned copending U.S. patent application of myself and Lawrence G. Kurland entitled "Interactive Cable Television System", bearing U.S. Ser. No. 66,162, filed Aug. 13, 1979, the contents of all of which are specifically incorporated by reference herein in their entirety.

BACKGROUND OF THE INVENTION

1. Field of the Invention

The present invention relates to two-way telephone subscriber systems and particularly to such systems capable of providing a verbally interactive telephone interrogation system.

2. Description of the Prior Art

Touch-Tone telephone systems are well known and extend throughout the United States. Such systems have been used for normal telephone conversations and as Datasets but have not, to applicant's knowledge, achieved their full utilization as a communications interface such as achieved by the present invention which utilizes the Touch-Tone type telephone in a verbally interactive telephone interrogation system. Interrogation systems, or multiple choice student response systems are well known, such as exemplified by the systems disclosed in U.S. Pat. Nos. 3,763,577; 3,774,316; 3,708,891; 3,623,238; 2,777,901; 3,194,895; 3,273,260; 3,484,950; 3,546,791; 3,947,972; 3,665,615; 3,245,157; 3,284,923; 3,538,621; 3,477,144; 4,078,316; and 3,255,536. In addition, broadcast audience polling systems are well known, such as disclosed in U.S. Pat. Nos. 2,674,512; 3,744,712; 3,776,453; 3,974,335 and 4,023,729. None of these prior art systems known to applicant, however, is a verbally interactive telephone interrogation system nor utilizes a conventional two-way telephone subscriber network to enable individual subscriber selection of telephone messages with which the subscriber may individually interact and/or to which the subscriber may respond and have the response recorded or accumulated in an automatic telephone survey. Recently, two-way communication systems have become popular for purposes of polling or interrogation, such as the cable TV system known as QUBE. However, this prior art system is not an individualized verbally interactive system nor is it a telephone interrogation system; rather, the subscriber merely responds to information which is flashed on the television screen to all subscribers at the same time. It should also be noted that the use of prerecorded telephone messages has been well known for considerable time, such as the weather or such as telephone answering machines. However, none of these prior art systems known to applicant is an individualized verbally interactive telephone interrogation system in which track selection is accomplished through use of the telephone key pad or in which telephone survey information may be recorded at a remote location through the use of the telephone key pad.

These disadvantages of the prior art are overcome by the present invention.

SUMMARY OF THE INVENTION

An improved verbally interactive telephone interrogation system is provided in which a two-way telephone subscriber network, such as a Touch-Tone type two-way telephone subscriber network, is utilized to enable both telephone call placement and individualized remote variable audio message selection and interrogation of prerecorded audio messages as well as remote response accumulation. The Touch-Tone type telephone, which is employed to maintain normal telephone contact with other subscribers, is also utilized to call-up a multitrack magnetic storage device which provides selectible reproducible conversational responsive audio messages to particular primary reproducible interrogatory messages from a plurality of different selectible audio messages stored thereon. A frequency decoder and track selection means is associated with the multitrack magnetic storage device for decoding tone signal outputs from the Touch-Tone type telephone to accomplish track selection subsequent to the connection of the subscriber to the multitrack magnetic storage device. Response recording, such as in conjunction with a pulse counter, may be operatively connected to the frequency decoder so as to accumulate responses to particular interrogatory messages based on reception of unique tone signal outputs from the Touch-Tone type telephones in the system. If desired, a conventional rotary dial type telephone can be employed with pulse counting and signal discrimination to distinguish between the various dial positions. In this manner, the telephone subscribers may verbally interact with the prerecorded messages as well as have their responses recorded, such as for an automatic telephone survey, by use of the conventional telephone key pad on their Touch-Tone type telephone or the conventional rotary dial on their dial type telephone.

The tone generator normally associated with the Touch-Tone type telephone selectively transmits a plurality of unique frequency separated tone signal outputs over the two-way telephone subscriber network with the telephone key pad selecting the unique tone signal outputs to be transmitted over the subscriber network. The multitrack message reproduction means comprises a multitrack magnetic storage medium providing a selectible reproducible conversational responsive audio message to a particular primary reproducible interrogatory message from a plurality of different selectible audio messages stored thereon and a multitrack audio playback means, such as a multitrack playback head and amplifier, for selectively transmitting the audio messages from the storage medium to the selectively connected telephone. The storage medium comprises a plurality of coextensive audio tracks having audio information stored thereon for audio playback therefrom with each of the plurality of tracks having a unique associated track selection frequency corresponding to one of the transmittable tone signal outputs. In this manner, the selectively connected frequency decoder and track selection means selects one of the plurality of audio tracks for playback by the playback means in response to reception and decoding of the tone signal output corresponding thereto.

The various tracks comprise associated multiple choice selectible responsive messages which are related in real time and content to each of a plurality of derivative secondary interrogatory containing messages with, preferably, only one of the plurality of other tracks comprising a unique selectible responsive message to a particular one of the real time related derivative secondary interrogatory messages which are chain linked in content to a particular primary interrogatory message. Thus, the stored primary and derivative secondary interrogatory messages and the associated responsive messages are spatially related to each other along the storage medium tracks in real time and further related in content to one another for providing a transitional derivative response to the primary interrogatory message dependent on the track selected and the real time of selection for providing a conversational real time transitional environment. In this manner, the telephone subscriber appears to verbally interact with the remotely located storage medium on an individual subscriber basis which may vary from call to call. Moreover, as previously discussed, the individual subscriber responses may be surveyed or recorded in any conventional manner for subsequent analysis, such as through the use of a pulse counter associated with specific unique tone signals which the subscriber is instructed to generate from the telephone key pad. Thus, the two-way telephone subscriber network also becomes a system for enabling accumulation and classification of subscriber responses to particular interrogatory messages.

DETAILED DESCRIPTION OF PREFERRED EMBODIMENT

Figure 1:
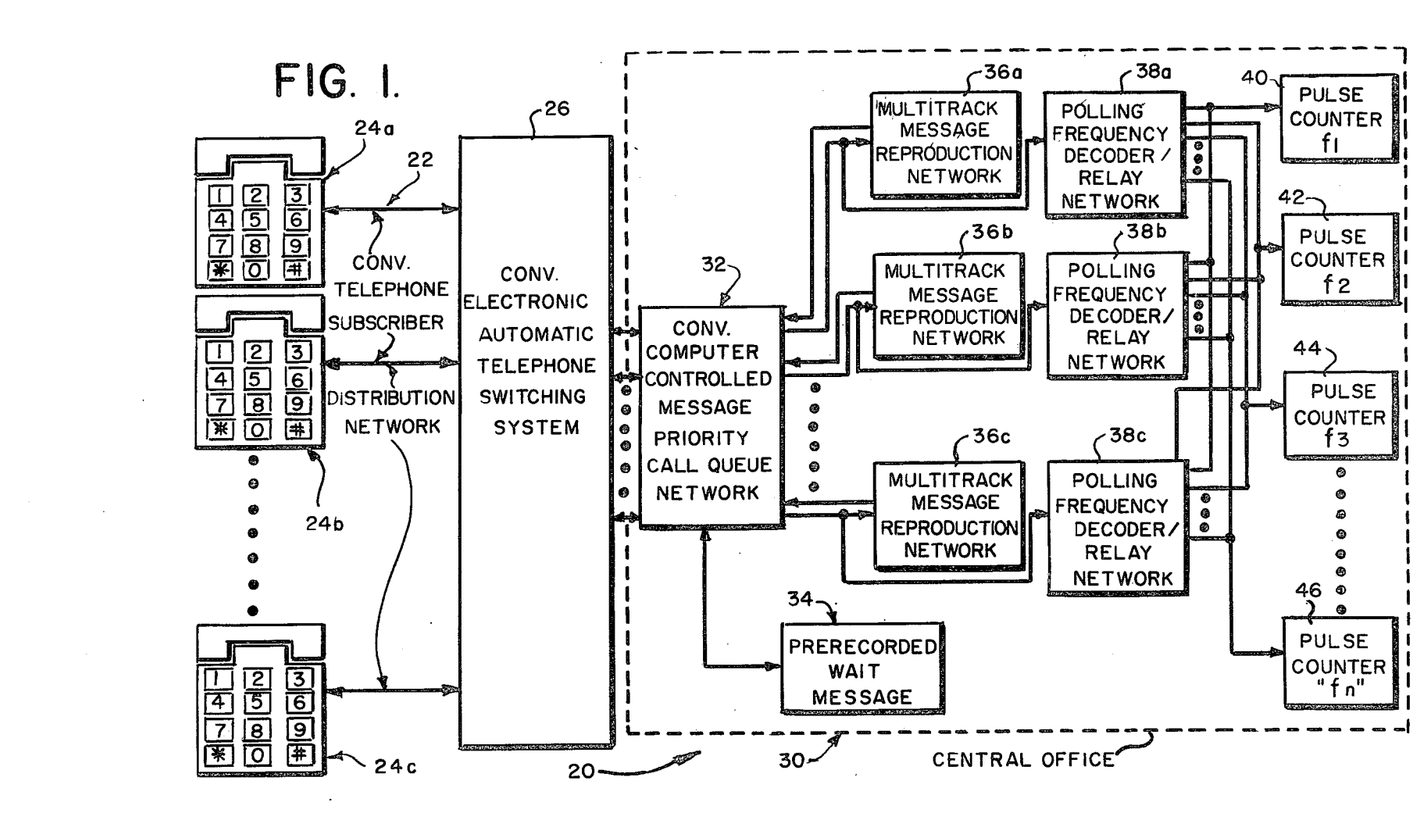
FIG. 1 is a functional block diagram of the presently preferred embodiment of the telephone interrogation system of the present invention.

Referring now to the drawings in detail and initially to FIG. 1 thereof, the presently preferred embodiment of the verbally interactive telephone interrogation system of the present invention, generally referred to by reference numeral 20, is shown. As shown and preferred in FIG. 1, telephone interrogation system 20 preferably employs a conventional two-way telephone subscriber network 22 including conventional Touch-Tone type push button telephones 24a, 24b and 24c, by way of example. These telephones 24a–c, inclusive, are conventional Touch-Tone type telephones, such as available from Western Electric, which each include a tone generator for selectively transmitting a plurality of unique frequency separated tone signal outputs over the two-way telephone subscriber network 22 and a telephone key pad or keyboard which is conventionally connected to the tone generator for selecting the unique tone signal outputs to be transmitted over the two-way telephone subscriber network 22.

Figure 2:
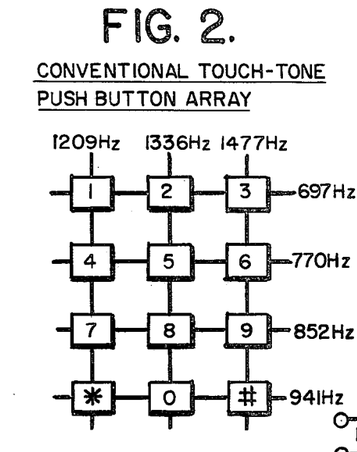
FIG. 2 is a diagrammatic illustration of a conventional arrangement of push buttons used for Touch-Tone telephone dialing illustrating a conventional Touch-Tone push button array.

A conventional Touch-Tone push button array with the associated conventional tone signal output frequencies is illustrated in FIG. 2. Thus, as shown and preferred in FIG. 2, the conventional Touch-Tone push button array comprises a 4-by-3 matrix of frequencies which is employed for the usual 10 number telephone dialing. Thus, each number in the conventional Touch-Tone push button array is represented by a pair of audio frequencies generated in the conventional telephone set and transmitter simultaneously with, for example, the number 5 being signaled by the transmission of tones of 770 Hz and 1336 Hz. Similarly, the number 7 is signaled by the transmission of tones of 852 Hz and 1209 Hz. Thus, as can be seen from the array in FIG. 2, each corresponding number is signaled by the transmission of tones of the "cross point" frequencies of the matrix array.

Figure 3:
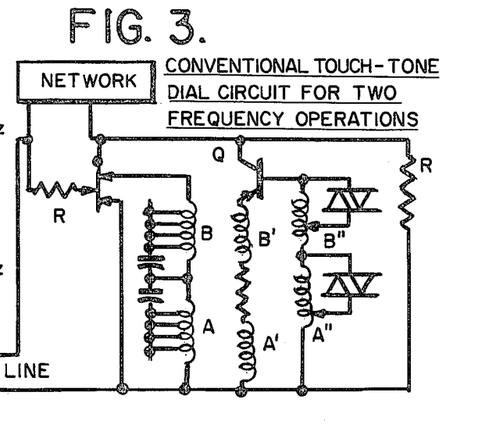
FIG. 3 is a schematic diagram, partially in block, of a conventional Touch-Tone dial circuit for two frequency operation.

The conventional circuit which is employed in conventional Touch-Tone or push button telephone dial sets for accomplishing such frequency generation is illustrated in FIG. 3. As is shown in FIG. 3, two independent tuned transformers A and B, with their respective windings in series, are employed to obtain two-frequency operation in this conventional circuit. The illustrated transistor Q is operated linearly and the amplitudes are limited by conventional varistors to make simultaneous oscillation at two frequencies possible. The various connection points on the transformers A and B in FIG. 3 represent the frequency selection contacts which are conventionally closed on each winding when a push button in the Touch-Tone push button array is depressed, interrupting the direct current and shock-exciting the oscillator. In this manner the tones generated by the push button dial which are in the voice-frequency range are conventionally transmitted throughout the conventional two-way telephone subscriber network 22. Apart from the conventional telephone key pad described above, each telephone 24a–24c also includes a conventional transmitter and receiver, such as a transmitter covering the frequency range of 200–3000 Hz. Thus, as is well known, the telephones 24a–24c may be employed in carrying on conventional two-way audio or verbal communication. For purposes of the system of the present invention, we are primarily interested in the ability of the telephone 24a–24c to receive audio messages and transmit the previously mentioned tone signals although, of course, one of the advantages of the present invention is that the system is employed in a conventional two-way telephone subscriber network so that the telephones 24a–24c may also be conventionally employed to carry on the aforementioned two-way verbal communication with other subscribers.

As also shown and preferred in FIG. 1, the verbally interactive telephone interrogation system 20 of the present invention includes a conventional electronic automatic telephone switching system 26 for routing the various calls to the subscribers throughout the two-way telephone subscriber network 22 dependent on the unique dialing codes which are input to the switching system from the telephone subscribers 24a–24c, by way of example. Since the functioning of the telephone switching system 26 is well understood by those of ordinary skill in the art, it will not be explained any further. Suffice it to say that any conventional electronic automatic telephone switching system conventionally employed in a Touch-Tone type telephone system may be utilized with the system 20 of the present invention.

The improvement of the present invention primarily resides in the central office, generally represented by reference numeral 30. For purposes of the present invention, the central office 30 represents one of the remote subscribers in the two-way telephone subscriber network 22 with this subscriber 30 preferably having a unique dialing code for enabling selective connection of the subscriber 30 to any particular telephone caller 24a–24c in the telephone subscriber network 22. Since a plurality of telephone callers may all attempt to contact the central office subscriber 30 at substantially the same time, a conventional computer controlled message priority call queue network 32 may be employed for treating these calls on a conventional FIFO or first-in-first-out basis with a prerecorded wait message, diagrammatically represented by reference numeral 34 being employed after a predetermined number of calls are received. Such message priority control and wait messages 32–34 are conventionally employed in the prior art, such as in dialing for airline reservation information, and such a conventional network may be employed in the present invention to achieve the function represented by reference numerals 32 and 34. Thus, as further illustrated in FIG. 1, in order to facilitate the number of telephone callers which may be in contact with the central office subscriber 30 at any given time, a plurality of multitrack message reproduction networks 36a, 36b and 36c, by way of example, are operatively connected to the message priority call queue network 32 so that any one of these networks 36a, 36b or 36c may be connected to the next available caller conventionally determined by network 32, with the prerecorded wait message 34 being provided when all of the message reproduction networks 36a–36c are "busy".

The use of a plurality of recorders which are controlled by a message priority call queue network 32 is also known in the art, however, the particular type of multitrack message reproduction networks 36a–36c have not been employed in a system such as system 30 to applicant's knowledge. Moreover, as will be explained in greater detail with reference to FIG. 4, the use of the conventional Touch-Tone telephone 24a–24c to control remote track selection of a multitrack message reproduction network 36a–36d is not to applicant's knowledge known in the art nor is the use of such a Touch-Tone telephone 24a–24c to enable remote telephone survey or polling known in the art. With respect to such remote telephone survey or polling, each of the multitrack message reproduction networks 36a–36c preferably has an associated polling frequency decoder/relay network 38a–38c, respectively. As shown and preferred in FIG. 1, each of the polling frequency decoder relay networks 38a–38c is preferably connected in parallel to a plurality of conventional pulse counters 40, 42, 44 and 46, with four such pulse counters being shown by way of example, and with each pulse counter 40–46 being responsive to a different unique associated frequency generated from the conventional Touch-Tone type telephones 24a–24c. As will be explained in greater detail hereinafter, the exemplary pulse counters 40–46 are merely illustrative of one presently preferred form of response recording and accumulation for facilitating accumulation and classification of the responses of the various telephone callers to particular interrogatory messages. However, other conventional response recording and accumulation devices may be employed such as conventional tape recorders upon which the various generated tones are recorded on particular tracks for subsequent playback and/or scanning and analysis.

Figure 6:
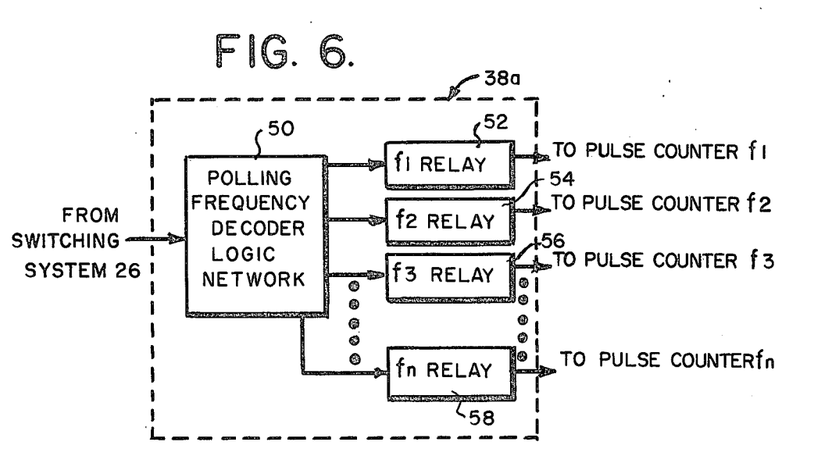
FIG. 6 is a block diagram of a typical polling frequency decoder/relay network portion of the system of FIG. 1.

As shown and preferred in FIG. 6, a typical polling frequency decoder/relay network, 38a by way of example, preferably includes a conventional polling frequency decoder logic network 50 which conventionally decodes or detects the incoming tone signal outputs from the connected telephone caller 24 provided conventionally through the switching system 26 and generates a pulse when the particular unique tone signal output is detected. A plurality of conventional relays, one associated with each pulse counter 40–46, such as relays 52, 54, 56 and 58, are connected to the decoder network 50 for selectively receiving the pulse signal when the associated tone signal output is detected by decoder network 50. Thus relay 52 will be operated when a particular tone frequency referred to as $f_1$ is detected, relay 54 will be operated when a unique tone frequency represented by $f_2$ is detected, relay 56 will be operated when a unique tone signal frequency represented by $f_3$ is detected and relay 58 will be operated when a unique tone signal frequency represented by $f_n$ is detected. Relay 52 is preferably connected to pulse counter 40, relay 54 is preferably connected to pulse counter 42, relay 56 is preferably connected to pulse counter 54 and relay 58 is preferably connected to pulse counter 56 for, respectively, incrementing the associated pulse counter each time the particular relay 52–58 is enabled or operated by decoder network 50.

Figure 4:
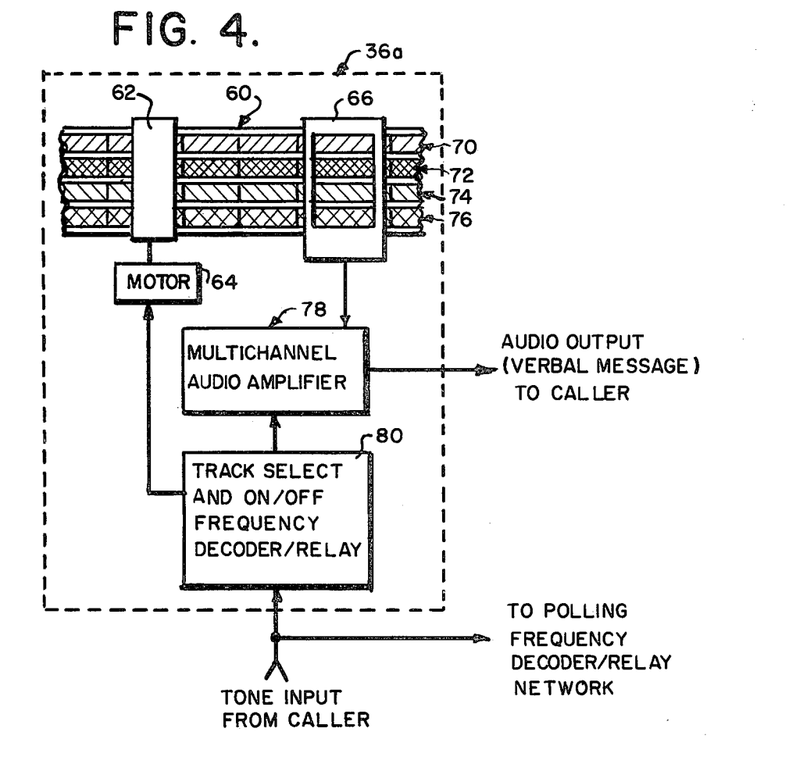
FIG. 4 is a diagrammatic illustration of a typical selection and playback portion of the multitrack message reproduction network portion of the system illustrated in FIG. 1.

Referring now to FIG. 4, a typical multitrack message reproduction network, 36a by way of example, is shown. The multitrack message reproduction network 36a preferably includes a multitrack magnetic storage medium 60 such as the type previously described in my U.S. Pat. No. 4,078,316 and my copending U.S. patent application Ser. No. 66,161, filed Aug. 13, 1979, and entitled "Dedicated Channel Interactive Cable Television System", and my commonly owned U.S. patent application of myself and Lawrence G. Kurland entitled "Interactive Cable Television System", bearing U.S. Ser. No. 66,162, filed Aug. 13, 1979, the contents of all of which are specifically incorporated by reference herein in their entirety. Thus, as fully explained in the above patent and applications, the magnetic storage medium 60 is preferably a multitrack magnetic tape such as one conventionally housed in a conventional type of reel-to-reel tape cassette housing for conventional capstan drive thereof via a conventional pressure roller and capstan represented by reference numeral 62 which are driven by a conventional motor drive represented by reference numeral 64 for providing the aforementioned conventional capstan drive of the multitrack magnetic tape 60. A conventional multitrack magnetic playback head 66 is preferably employed in connection with the magnetic storage medium 60 for selectively reading or playing back the information stored on a given one of the multiple audio tracks, with four such tracks 70, 72, 74, 76 being shown by way of example, with the information from the playback head 66 being provided to a conventional multichannel audio amplifier 78. Any of the tracks 70–76 may contain questions or interrogatory information with any of the other tracks containing responsive messages related in real time and content to a particular interrogatory message on a different track. As described in the aforementioned copending U.S. patent applications, the information is preferably stored on each track in a plurality of reproducible information segments with each of the segments comprising a complete message reproducible directly in response to selective playback of the track upon which the segments are being stored. At least one of the tracks at a given time contains stored information which comprises primary interrogatory messages and associated multiple choice selectible responses such as derivative secondary interrogatory containing messages related in content to a particular primary interrogatory message. In addition, at least a plurality of the other tracks at any given time preferably comprise messages related in real time and content to the aforementioned primary interrogatory message, such as derivative secondary interrogatory containing messages, and corresponding to the multiple choice selectible derivative secondary interrogatory containing messages with each of the plurality of other tracks, in such an instance, preferably comprising a different derivative secondary interrogatory containing message. Under such circumstances, the plurality of other tracks further comprises associated multiple choice selectible response messages related in real time and content to each of the plurality of derivative secondary interrogatory containing messages with only one of the plurality of other tracks preferably comprising a unique selectible responsive message to the particular one of the real time related derivative secondary interrogatory messages which are preferably chain linked in content to a particular primary interrogatory message. Thus, preferably the stored primary and derivative secondary interrogatory messages contained on the magnetic storage medium 60 and the associated stored responsive messages are spatially related to each other along the storage medium 60 tracks in real time and further related in content to one another for providing a transitional derivative response to the primary interrogatory message provided at a given time dependent on the track selected and the real time of selection for providing a conversational real time transitional environment. As further set out in the aforementioned patent and copending U.S. patent applications, the primary interrogatory message may comprise a plurality of multiple choice selectible different interrogatory messages each comprising a different category of question with each of the different categories of questions being associated with a different one of the plurality of other tracks and with the secondary derivative interrogatory messages corresponding to the different categories of questions whereby a plurality of different interrogatories may be simultaneously selectible. In such an instance, the associated responsive messages preferably comprise a common set of responsive messages for each of the different selectible secondary derivative interrogatory messages. Moreover, as further set out, each of the plurality of tracks may contain both an instructional message directly referring to the previously selected responsive message and indicating the correctness of the previously selected responsive message and a subsequent different multiple choice selectible primary interrogatory message with the other tracks further containing a common set of selectible responsive messages associated with the subsequent different primary interrogatory messages for providing a limited memory type of conversational environment. The extent of the aforementioned reproducible information segments is illustrative represented in FIG. 4 by the spacing between a pair of solid vertical lines on a given track.

In order to provide playback of the information magnetically stored on a particular tape 60, as previously mentioned, a conventional multichannel audio amplifier 78 is selectively connected to playback head 66 so as to conventionally playback the information stored on the respective audio tracks selected. The output of audio amplifier 78 is preferably connected to a multiple choice track select and on/off frequency decoder/relay network 80 which is similar in structure and operation to polling frequency decoder/relay network 38$a$, by way of example (FIG. 6). Thus, network 80 preferably comprises a relay or switch for each channel or track of the multitrack audio tape 60 with each of the relays being responsive to a different unique frequency. Thus, as with respect to network 38$a$, a conventional frequency decoder logic network, similar to network 50, detects the tone signal inputs provided from the telephone caller 24 which has been connected to the message reproduction network 36$a$ through the telephone switching system 26 and, assuming an appropriate tone signal frequency has been generated, enables the relay corresponding to that particular track which, in turn, connects the output of the audio amplifier for that track to the telephone caller through the switching system 26 over the conventional two-way telephone subscriber network 22. The track selection frequencies are preferably chosen so as to be different from the polling frequencies employed with the polling frequency decoder/relay network 38 as well as being different from the frequencies employed with the unique dialing code for enabling connection to the central office subscriber 30. Network 80 preferably also contains a relay which is connected to motor 64 for turning on the motor 64 and operating the tape drive for magnetic storage medium 60 in response to receipt of a control signal from message priority network 32. If desired, the motor 64 and its control network may be arranged to shut off after a predetermined time period or, instead, may stay enabled for as long as the caller remains on the line. In such an instance, a prerecorded message may be contained on the tape to advise the caller to "hang-up".

The type of instructional messages contained on the magnetic storage medium 60, in addition to advising the caller of choices for track selection, may also advise the caller as to which button to push on the telephone key pad in order to "record" a particular response to a telephone survey or polling question. Thus, for example, the caller may be advised that if he/she believes that Mr. X should be President of the United States button 9 should be pushed, whereas if he/she believes Mr. Y should be President of the United States button 7 should be pushed and if he/she believes that Mr. Z should be President of the United States button 4 should be pushed. In such an instance, button 9 corresponds to frequency $f_1$ or pulse counter 40, button 7 corresponds to frequency $f_2$ or pulse counter 42 and button 4 corresponds to frequency $f_3$ or pulse counter 44. Whichever button is pushed will cause transmission of the corresponding tone frequency signal output which, in turn, will be detected by decoder network 50, and will enable the appropriate relay 52, 54 or 56 which, in turn, will increment the associated pulse counter 40, 42 or 44 to accumulate the response of the subscriber with that of other subscribers asked the same question. Such telephone polling or surveying may be done without employing a multitrack tape system if the conversational features of the invention are not desired. In such an instance, a conventional single track magnetic playback device may be employed to merely advise the caller as to a particular interrogatory or question to be polled and as to instructional information as to which button to push to indicate the desired response to that question.

Figure 5:
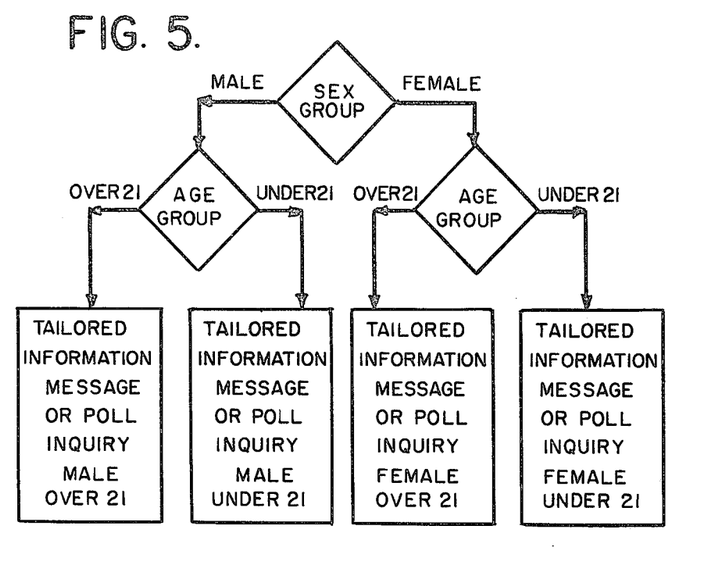
FIG. 5 is a logic flow diagram illustrative of a decision tree in accordance with a memory accumulation function of the system of the present invention.

Referring now to FIG. 5, this represents an arrangement similar to what is shown in FIG. 12 of the aforementioned copending U.S. patent applications in which it is fully described as illustrating a decision tree in accordance with a memory accumulation function which may also be performed in accordance with the interrogation system 20 of the present invention. Thus, specific tailored information messages or poll inquiries may be directed to the individual telephone callers with a different push button or frequency being assigned to record a response of, for example, a male over 21 or a male under 21 or a female over 21 or a female under 21, so that individualized tailored responses may be rapidly electronically surveyed through the use of a conventional two-way subscriber telephone system or, alternatively, so that telephone callers may get individualized or personalized messages depending on the category into which they fall. A simple application of this technique may be employed in providing "personalized" information as to airline flight reservations to specific cities or specific types of restaurants by category or any other type of information which may be readily categorized so that not only may surveys by readily categorized or individualized but information provided to callers may be similarly treated. Another example of such "branching" assistance could be with respect to emergencies in which calls could automatically be branched before a human response were required. For example, assuming a caller wishes emergency assistance, the information provided from the magnetic storage medium 60 could be an interrogatory inquiring as to whether the caller requires an ambulance, a fire fighter or police with the caller being given specific instructional information relating to track selection dependent on which category is desired. Thereafter, the appropriate track would contain the proper telephone numbers, preventative measures to take and/or enable switching to a live clerk specializing in these matters. Another example could be in the instance of a small company switchboard in which the system would contain information relating to the person desired to be called and the appropriate code or corresponding push button or buttons, with subsequent branching occurring if necessary. Many other uses of the interrogation system of the present invention will readily occur to one of ordinary skill in the art such as the various uses alluded to in the aforementioned U.S. patent and copending patent applications. Sample programs illustrative of the spatial relationship and real time interaction of the various tracks are contained in the aforementioned U.S. patent and copending patent applications which are specifically incorporated by reference herein in their entirety and need not be repeated herein. Suffice it to say that such spatial relationship may readily be employed for the various types of audio messages referred to herein.

If desired, the system 20 of the present invention may be employed in conjunction with a conventional rotary dial-type two-way telephone subscriber network in place of the aforementioned Touch-Tone type push button telephone subscriber network 22. In such an instance, a conventional pulse counting and signal discriminator may be employed in place of the aforementioned frequency decoder network 80 to discriminate between the various pulse counts associated with the different rotary dial positions on the conventional rotary dial-type telephone rotary dial. Thereafter, track selection is accomplished in substantially the same manner as previously described, with each of the tracks having an associated unique rotary dial pulse count.

It is to be understood that the above described embodiment of the invention is merely illustrative of the principles thereof and that numerous modifications and embodiments of the invention may be derived within the spirit and scope thereof such as by employing the verbally interactive portion of this system without the telephone polling or survey portion of the system and vice versa; or by relabelling the various telephone number positions for special purposes. In addition, the system can be employed for any type of information transmission such as horoscopes, dial-a-joke, sports quizzes, traffic reports, travel information, dining information, etc.

What is claimed is:

1. In a verbally interactive telephone interrogation system comprising a two-way telephone subscriber network including a telephone caller means and a telephone message routing means operatively connected to said telephone caller means for selectively connecting said telephone caller means to a remote message transmission means having an associated telephone number in response to provision of a unique dialing code from said telephone caller means corresponding to said associated telephone number; said telephone caller means comprising telephone reception means for receiving audio messages over said two-way telephone subscriber network; signal generator means for selectively transmitting a plurality of unique signal outputs over said two-way telephone subscriber network, and keyboard means operatively connected to said signal generator means for selecting the unique signal outputs to be transmitted over said two-way telephone subscriber network, said keyboard means comprising a plurality of selection keys each of which corresponds to a different associated signal output transmittable by said generator means in response to selection thereof; the improvement comprising signal discriminator and track selection means operatively connected to said telephone message routing means for enabling reception of said transmitted signal outputs from said telephone caller means when said telephone caller means is connected thereto via said telephone message routing means; and multitrack message reproduction means for selectively transmitting an audio message to said telephone caller means telephone reception means in response to selection by said telephone caller means keyboard means, said remote message transmission means comprising said multitrack message reproduction means, said multitrack message reproduction means comprising a multitrack magnetic storage medium for providing a selectible reproducible conversational responsive audio message to a particular primary reproducible interrogatory message from a plurality of different selectible audio messages stored thereon and a multitrack audio playback means for selectively transmitting said audio messages from said storage medium to said selectively connected telephone reception means, said storage medium comprising a plurality of coextensive audio tracks having audio information stored thereon for audio playback therefrom, said signal discriminator and track selection means discriminating said received output signals transmitted from said caller means, each of said plurality of tracks having a unique associated track selection signal corresponding to one of said transmittable signal outputs, said selectively connected signal discriminator and track selection means selecting one of said plurality of audio tracks for playback by said playback means in response to reception and discrimination of the signal output corresponding thereto, said information being stored on each track in a plurality of reproducible information segments, each of said segments comprising a complete message reproducible directly in response to selective playback of said track upon which said segments are stored, at least one of said tracks stored information comprising primary interrogatory messages and associated multiple choice selectible derivative secondary interrogatory containing messages related in content to a particular primary interrogatory message, at least a plurality of said other tracks comprising derivative secondary interrogatory containing messages related in real time and content to said one track primary interrogatory messages and corresponding to said multiple choice selectible derivative secondary interrogatory containing messages, each of said plurality of other tracks comprising a different derivative secondary interrogatory containing message, said plurality of other tracks further comprising associated multiple choice selectible responsive messages related in real time and content to each of said plurality of derivative secondary interrogatory containing messages, only one of said plurality of other tracks comprising a unique selectible responsive message to a particular one of said real time related derivative secondary interrogatory messages, said derivative secondary interrogatory messages being chain linked in content to a particular primary interrogatory message for forming a caller selectible decision tree for ultimately directing said telephone caller to an ultimate branch on said selected decision tree, said stored primary and derivative secondary interrogatory messages and said associated responsive messages being spatially related to each other along said storage medium tracks in real time and further related in content to one another for providing a transitional derivative response to said primary interrogatory message dependent on the track selected and the real time of selection for providing a conversational real time transitional environment said primary interrogatory message comprising a plurality of multiple choice selectible different interrogatory messages each comprising a different category of question, each of said different categories of questions being associated with a different one of said plurality of other tracks, said secondary derivative categories messages corresponding to said different interrogatories of questions whereby a plurality of different interrogatories are simultaneously selectible, in a variable decision tree format, said associated responsive messages comprising a common set of responsive messages for each of said different selectible secondary derivative interrogatory messages, whereby said ultimate selectable decision tree branch is dependent upon the responses to said primary and secondary interrogatory messages comprising said selectable decision tree.

2. An improved system in accordance with claim 1 wherein said signal generator comprises a tone signal generator means for selectively transmitting a plurality of unique frequency separated tone output signals over said two-way telephone subscriber network, said keyboard means selecting said unique tone output signals to be transmitted over said two-way telephone subscriber network, each of said selection keys corresponding to a different associated tone output signal transmittable by said tone signal generator, said signal discriminator and track selection means comprising frequency decoder and track selection means for enabling reception of said transmitted tone output signals, said frequency frequency decoder and track selection means decoding said received tone output signals, each of said plurality of tracks having a unique associated tone selection frequency corresponding to one of said transmittable tone signal outputs, said selectively connected frequency decoder and track selection means selecting one of said plurality of audio tracks for playback by said playback means in response to reception and decoding of the tone signal output corresponding thereto.

3. An improved system in accordance with claim 1 wherein said magnetic storage medium comprises magnetic tape.

4. An improved system in accordance with claim 1 wherein each of said plurality of tracks contains both an instructional message directly referring to the previously selected responsive message and indicating the correctness of said previously selected responsive message and a subsequent different multiple choice selectible primary interrogatory message, said other tracks further comprising a common set of selectible responsive messages associated with said subsequent different primary interrogatory messages, whereby a limited memory type conversational environment is provided.

5. An improved system in accordance with claim 2 wherein said system further comprises response recording means for accumulating responses to particular interrogatory messages, said response recording means being operatively connected to said frequency decoder means, a unique tone signal output from said keyboard means being associated with a particular response to be accumulated, whereby a particular selection of said keys on said keyboard means in response to a particular audio interrogatory message transmitted from said magnetic storage medium over said two-way telephone subscriber network will enable accumulation and classification of the responses to said particular interrogatory message.

6. An improved system in accordance with claim 5 wherein said response recording means comprises pulse counter means, said frequency decoder means comprising means for detecting said unique tone signal output and providing a pulse signal to said pulse counter means.

7. An improved system in accordance with claim 2 wherein said telephone subscriber network comprises a plurality of said telephone caller means selectively connectable to said remote message transmission means via said telephone message routing means.

8. An improved system in accordance with claim 7 wherein said telephone message routing means comprises priority switching means for selectively connecting said telephone caller means to said remote message transmission means in accordance with the priority of reception of said unique dialing code from said plurality of telephone caller means.

9. An improved system in accordance with claim 8 wherein said remote message transmission means comprises a plurality of said multitrack message reproduction means each of which has an associated one of said frequency decoder and track selection means, said telephone message routing means connecting one of said telephone caller means to one of said multitrack message reproduction means and its associated frequency decoder and track selection means in accordance with reception of said unique dialing code.

10. An improved system in accordance with claim 1 wherein said telephone subscriber network comprises a plurality of said telephone caller means each of which further comprises telephone transmission means for transmitting audio messages over said two-way telephone subscriber network to other telephone subscribers when selectively connected thereto.

11. An improved system in accordance with claim 1 wherein said telephone subscriber network comprises response recording means for accumulating responses to particular interrogatory audio messages transmitted from said remote message transmission means, said response recording means being operatively connected to said signal discriminator means, a unique signal output from said keyboard means being associated with a particuar response to be accumulated, whereby a particular selection of said keys on said keyboard means in response to a particular audio interogatory message transmitted from said remote message transmission means over said two-way telephone subscriber network will enable accumulation and classification of the responses to said particular interrogatory message.

12. An improved system in accordance with claim 11 wherein said telephone subscriber network comprises a plurality of said telephone caller means selectively connectable to said remote message transmission means via said telephone message routing means.

13. An improved system in accordance with claim 11 wherein said telephone subscriber network comprises a plurality of said telephone caller means each of which further comprises telephone transmission means for transmitting audio messages over said two-way telephone subscriber network to other telephone subscribers when selectively connected thereto.

* * * * *